Aug. 18, 1931.  T. ROBINSON  1,819,199
METHOD OF MAKING BUILDING MATERIALS
Original Filed Oct. 5, 1926   2 Sheets-Sheet 1
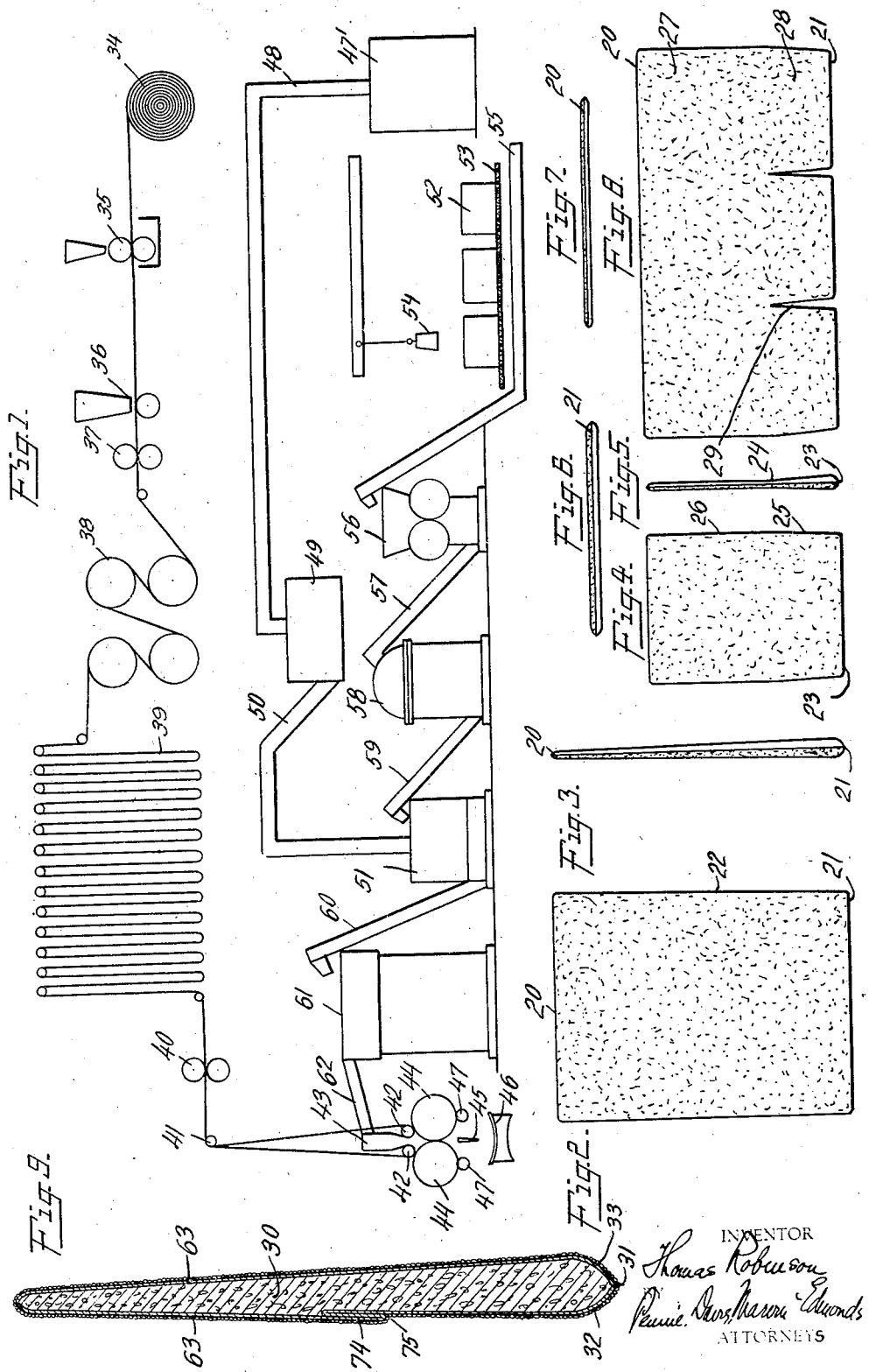

Aug. 18, 1931.                T. ROBINSON                1,819,199
METHOD OF MAKING BUILDING MATERIALS
Original Filed Oct. 5, 1926    2 Sheets-Sheet 2
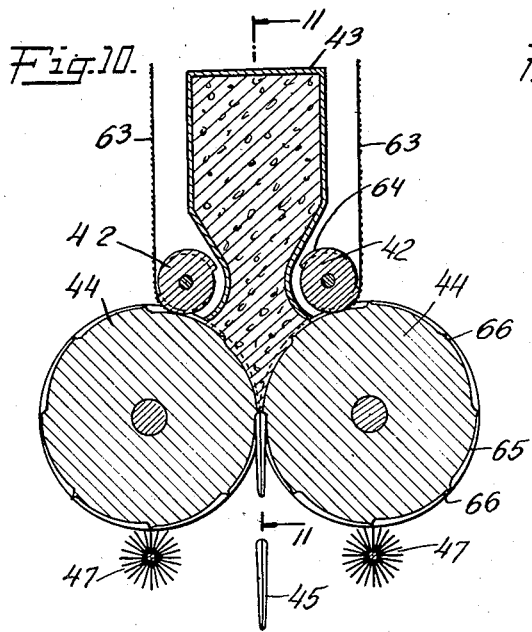
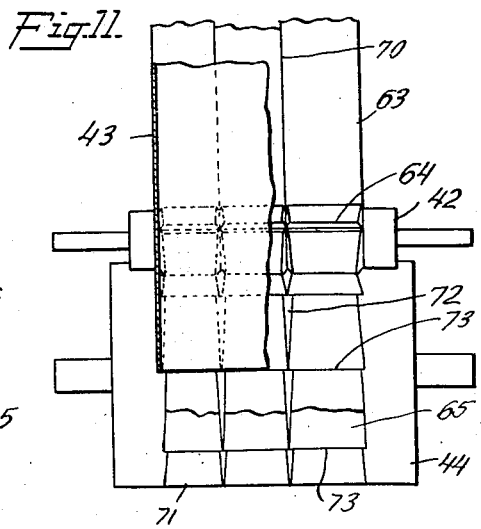
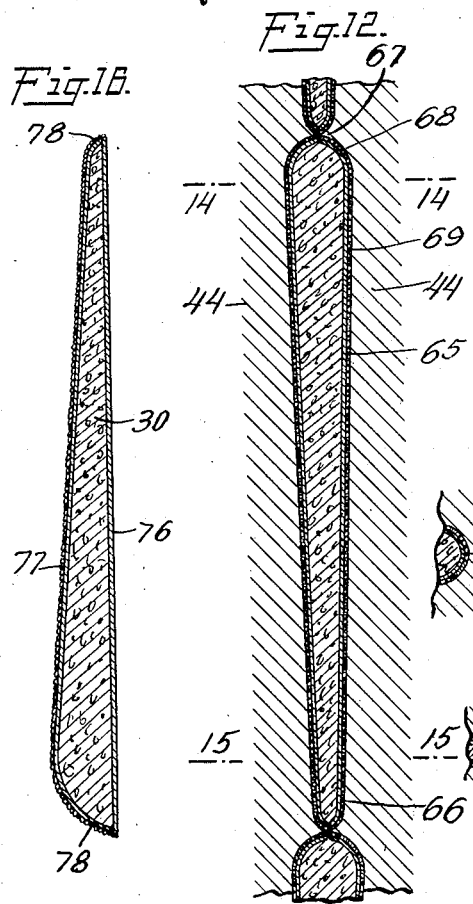
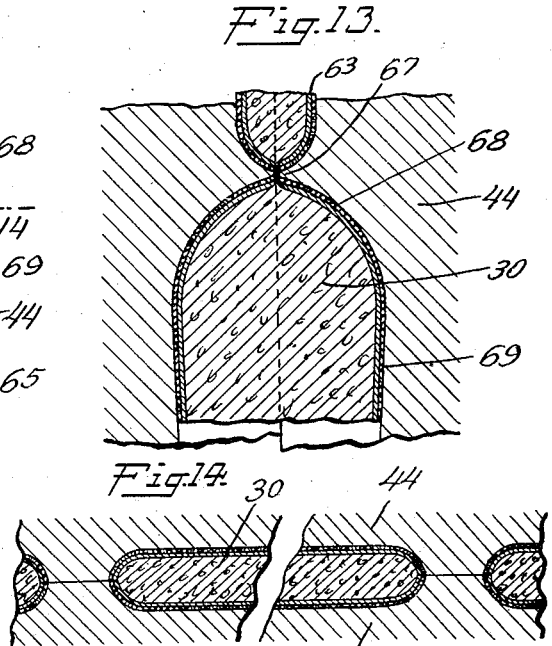
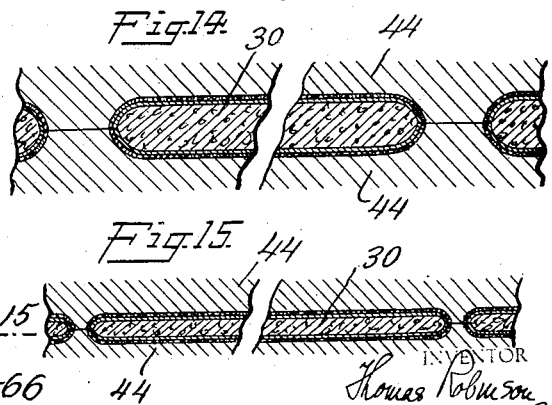
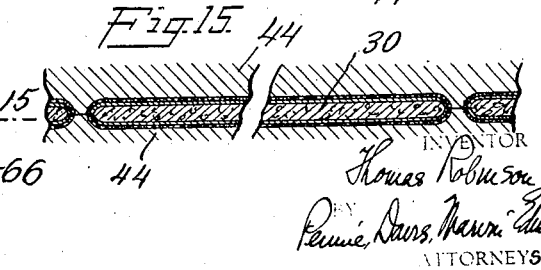

Patented Aug. 18, 1931

1,819,199

UNITED STATES PATENT OFFICE

THOMAS ROBINSON, OF NEW YORK, N. Y., ASSIGNOR TO LANCASTER ASPHALT, INC.

METHOD OF MAKING BUILDING MATERIALS

Original application filed October 5, 1926, Serial No. 139,612. Divided and this application filed September 12, 1927. Serial No. 219,010.

This invention relates to materials suitable for use in building construction, and is concerned more particularly with a method of making an improved product which may be produced in different forms and shapes to be used as roofing, siding, and the like. The product produced by this method, while capable of use to advantage in many ways, is probably of greatest utility as a roofing material replacing either shingles of wood or so-called "prepared roofings" of impregnated felt, molded asbestos products, and of other similar materials. Accordingly for purposes of description and illustration, the new product will be referred to hereafter as roofing, and different forms of material especially adapted for that purpose and methods of producing such products will be set forth in detail, though it is to be understood that the utility of the new material and of the method of making it are by no means limited to any particular use, its use as a roofing being merely typical of its wide application in building construction.

Prepared roofing now in widest use consists of a felted sheet saturated and coated with asphalt. This sheet material is used as a roll roofing or in the form of shingles, either single or multiple, and for the latter use the felt is commonly provided with a wear surface of granular material such as crushed slate. Such roofing is cheaper and more resistant to fire than ordinary wood shingles, but the felt is relatively expensive and the shingles made from it are quite thin, so that the roof does not have the attractive appearance which results from the use of thick butt shingles which cast a considerable shadow.

The material produced by the new method differs from those heretofore commonly used for the manufacture of roofing products in that the major part of the product is made of a hardened plastic material which is provided with a protective jacket. This jacket not only covers both faces of the mass or core of the plastic material but also preferably extends over its side and end edges, thus reinforcing and protecting the core and also preventing its extrusion at the edges when laid, due to pressure. The encased core is completed by the application of a sealing layer and a wear material of a suitable type affixed to the jacket.

The materials which may be used in the core cover a wide variety of substances which have the property of becoming hard on setting. I prefer to employ a bituminous material, such as asphalt, as a binder and with this mix a finely divided solid material, such as crushed slate, or granite, sand, fine rock, or the like. But instead of a mineral material which gives the product considerable weight, it may be desirable in some instances to employ saw dust, asbestos sand, fibrous asbestos, granulated cork, etc. Infusorial earth may also be used, or suitable mixtures of the above substances. Instead of using a bituminous binder, it is possible to use cementitious materials of various kinds, the materials being selected so that the mixture of binder and solid will, upon setting, form a compact, substantially rigid body. I prefer asphalt for the purpose because of its cheapness and easy working qualities and because a product made from it may be readily cut, or pierced by nails, but it is evident that the binder used should be one which will not be detrimentally affected by solar heat and if asphalt is employed, it should have a suitable melting point, for example 180°–220° F.

The jacket to be used is preferably a flexible fibrous sheet of relatively light weight, and a heavy coarse paper may be satisfactorily used, either impregnated with water-resistant material or not, as may be desired. Other materials than paper may be employed but paper of a cheap grade serves the purpose satisfactorily and is easily handled.

In the manufacture of the improved product according to the method of this invention, a quantity of the core material is placed between a pair of jacket sheets and then the core and jacket are subjected to a molding operation by the application of pressure. The pressure is applied by means of molding surfaces of appropriate form which act to consolidate and shape the core material and to press the jacket into thorough contact with all portions of the core. These molding surfaces are preferably arranged with cutting or pinching edges which outline the shape of the finished product and their action therefore is not only to give the core the desired shape but also to cut the sheets around the outline of the core.

The sheets used for the jacket are preferably saturated and coated with a water-resistant material such as asphalt and given their coating of wear material prior to their introduction with the core material between the molding surfaces, so that after the action of the latter, the product is finished and ready for immediate use. Also, I prefer to carry on the molding and cutting operations by rotary presses, as such apparatus greatly simplifies the feeding of the jacket and core material.

For a better understanding of the invention, reference will be made to the accompanying drawings, illustrating the new product in various forms and also the method by which it is made. In these drawings, Fig. 1 is a conventional view in side elevation illustrative of the steps in the method and apparatus by which this method can be practiced, Fig. 2 is a plan view of one form of roofing element produced by the new method, Fig. 3 is an edge view of this element, Fig. 4 and Fig. 5 are face and side edge views respectively of a modified form of element, Figs. 6 and 7 are views of the butt and thin edges respectively of this element, Fig. 8 is a face view of a multiple unit element, Fig. 9 is a sectional view of one form of the element on an enlarged scale, Fig. 10 is a vertical sectional view through the apparatus by which the improved method may be practiced, Fig. 11 is a sectional view on the line 11—11 of Fig. 10, Figs. 12 and 13 are developed sectional views through parts of the apparatus, Fig. 13 being on a larger scale than Fig. 12, Figs. 14 and 15 are enlarged sectional views on the lines 14—14 and 15—15 respectively of Fig. 12, and Fig. 16 is an enlarged sectional view similar to Fig. 9, but illustrating a different form of product.

Referring now to the drawings, one form of the material produced by the new process is illustrated in Fig. 2, this material having the form of a single shingle of gradually tapering section with its thin edge 20 of slightly greater length than its thicker or butt edge 21. The side edges 22 converge slightly from the rear thin edge to the forward thick butt edge and when these elements are laid side by side in courses they are placed with their rear ends substantially in contact, whereupon the exposed portions at the butts of the elements lie separated slightly due to the shorter transverse dimension of the butt.

In the product illustrated in Fig. 4 the single shingle element has an increased thickness at its butt end 23 but the major portion of the element is of uniform cross-section, the thickness increasing from the point 24 to the butt edge and this point lying slightly to the rear of the normally exposed portion of the shingle. From this point 24 where the thickness of the element begins to increase the edges begin to converge as indicated at 25. Thus again when the elements of this type are laid in the usual courses with the straight portions 26 of their lateral edges in contact, the thick exposed butt portions are separated by spaces so that the roof has the appearance of being covered by heavy individual shingles which are laid in spaced relation in the same way as ordinary wooden shingles.

In Fig. 8 there is illustrated a multi-unit element or so-called strip shingle, the main body 27 of which has a length corresponding to the widths of three separate individual elements, and the thick or butt edge of the element is provided with edge tabs 28 formed by notches 29, these notches extending inwardly from the edge and converging slightly, as illustrated. Such a multi-unit shingle may be made either with gradually tapering thickness similar to the element shown in Fig. 3, or else may have the section of the element illustrated in Fig. 5, in which event only the tabs are of increasing thickness.

All of the elements illustrated consist of a body of plastic material 30 (Fig. 9) which is made up preferably of a finely divided solid substance, which for convenience may be termed an aggregate, and a binder. This solid material may be of various types, of which examples have previously been given, and the binder is preferably a bituminous compound, such as asphalt. The plastic material is formed by appropriate treatment to the desired shape and it is encased in a jacket which covers both faces of the body and of all its edges. The body is thus completely enclosed in the jacket and the body of plastic material is thus strengthened and reinforced. Furthermore, by the use of this jacket, as will presently appear, the formation of the body of plastic material is greatly simplified and in addition, warping or bulging of the plastic material is prevented. The jacket which I prefer to use is a cheap coarse paper which may be impregnated with a waterproofing compound, such as asphalt of a suitable melting point.

In the production of these elements in accordance with the method of this invention, a pair of facing sheets of the paper are placed on either side of a quantity of plastic material and then the paper and the material are acted on by suitable molding means which consolidate and mold the plastic material to the desired shape, force the paper into intimate contact with it, and wrap the paper over the edges. Preferably in the formation of the shingles the size of the paper is selected with reference to the size of the final core of plastic material, so that the edges of the paper meet at the edges of the core, as at 31 (Fig. 9) and in the shaping process the edges of the core are preferably somewhat rounded and the meeting edges of the paper thus lie between the planes of the faces of the core.

In accordance with the process of the present invention, the element of the type described is produced by a molding operation by which the extreme edges of the element lie between the planes of its two faces and these faces preferably taper toward these edges with a gradual curve, as indicated at 32. Each edge of the element is illustrated in Fig. 9 therefore as a section somewhat similar to a pointed arch, and when these elements are laid in overlapping courses in the usual manner, the butt ends appear to have a considerable thickness because the extreme butt edge 31 lies spaced above the surface of the element which is next beneath it. Due to the curve of the under surface of each element, as at 33, there is a considerable distance between the point where the upper element contacts with the surface of the lower element and the extreme butt edge 31 of the upper element so that this butt edge casts an exaggerated shadow, causing the butt apparently to be of great thickness. The use of a tapered arch section at the edges of the element is not essential, however, and other types of section through these edges may be used, if desired.

The process employed in the manufacture of the new element is illustrated diagrammatically in Fig. 1, where the two webs of jacket material are drawn from a supply roll 34. The supply may take the form of a single roll with the two webs wound about one core, or a pair of webs wound on separate cores may be used. The two webs are drawn from the supply and with their adjacent faces in contact pass through a coating mechanism, conventionally illustrated at 35. This mechanism may be of any standard form, such for instance as one including upper and lower rolls together with appropriate means by which a coating, preferably of water-resistant material, may be applied to the outer faces of the two webs which pass between the rolls in contact. The coating material is to act as a sealing coat and I prefer to employ for the purpose asphalt having a melting point suitable to withstand solar heat.

Beyond the coating mechanism 35 the webs pass through a surfacing mechanism, generally designated 36. This mechanism is arranged to apply a suitable surfacing material to one or both webs and it consists of a hopper for the material, which may be crushed slate or the like, and pressing rolls 37 which embed the surfacing material in the coatings on the webs. The coating apparatus may be arranged to apply granular material to the faces of one or both webs, or to apply a granular wear material to one face of one web and a non-stick material, such as talc, to the face of the other web. The coating apparatus is of standard construction commonly used in the roofing industry and does not require further description. Beyond the rolls 37 the webs pass around water-cooled rolls 38 for the purpose of cooling and hardening the coating layers. Thereafter the webs pass through a loop cooling system 39, such as is commonly used in roofing manufacture, the system being arranged to pass the webs along in depending loops or festoons so that the travel of the webs is very slow and they are cooled by exposure to the air.

After being cooled, the webs pass through cutting rolls 40 which in some instances may be dispensed with, and are used only when the webs have a greater dimension than the products which are to be made from them. For example, a 36" web may be used for the production of products having 10, 12, and 14" width. When elements are to be made from a wider web than 36", the web may be slit by means of the cutting machines into the desired subdivisions.

From the slitting rolls 40 the webs are led around a guide roll 41 and are then separated and passed around rolls 42. These rolls serve to separate the webs so that they will pass on either side of a receptacle 43 containing the plastic filling material, and the rolls 42 likewise force the webs into contact with rotary molding cylinders 44 which have cavities in their faces. If desired, the rolls 42 may have projections on their surfaces corresponding in shape and position to the cavities, so that rolls 42 serve to force the webs into the cavities in the cylinders, thus shaping the webs to facilitate subsequent operations.

The receptacle or hopper 43 placed between the separated webs is open at the bottom to discharge core material into the bite of the cylinders 44. As the webs pass between rolls 42 and 44 and are carried along with the cylinders as the latter rotate, a quantity of core material is discharged from the receptacle 43 and enters between the portions of the webs lying in front of the cooperating mold cavities in the two cylinders 44. The material flows from the receptacle continuously into the space between the webs and as the cylinders rotate, a portion of the plastic material is caught between cooperating cavities, consolidated, and molded to appropriate form. The movement of the webs between the cylinders has a tendency to draw plastic material down through the bite of the rolls and this plastic material is caught in the mold cavities and the excess forced upwardly into the receptacle. The amount lodged between each pair of cavities is sufficient to cause the webs to lie flat against the bottom faces of the cavities so that the webs and the mass of material between them are given a shape corresponding to the shape of the cavities. The cylinders 44 are provided with cutting edges around the cavities so that as the molding operation proceeds, the edges of the webs around the plastic body shaped by the mold cavities, are severed and trimmed. The further rotation of the cylinders causes the severed elements 45 to be discharged upon a conveyor 46 which transfers these elements to an appropriate point. Cleaning means, such as brushes 47, may be used to clean the faces of the mold cavities after the elements have been discharged therefrom.

The preparation of the core material is carried on simultaneously with the preparation of the webs. The apparatus illustrated is intended to be used to produce an element having a core of a bituminous binder and finely divided solid material, and the bituminous binder used is asphalt which is mixed with solid material in dry condition and then heated to produce a plastic mass. The apparatus therefore includes a bin or receptacle 47' for the solid material which is conveyed from the bin by a suitable conveyor 48 to a heating device 49 in which the temperature of the material is raised to facilitate its mixture with and the heating of the asphalt. From this device a conveyor 50 transfers the solid material to a measuring apparatus 51. The conveyors, the heating device, and the measuring apparatus are all of standard commercial construction and do not require further explanation.

The asphalt is received in drums which are stripped from the solid masses and these masses of asphalt 52 are placed on a grille 53 over which is a skull cracker 54. This device includes a heavy weight raised by appropriate means and then allowed to fall on the asphalt, crushing the solid masses and breaking them into fine fragments. The grille is of suitable construction so that when the asphalt is broken into relatively fine chunks, it may pass through the spaces of the grille to be discharged upon a conveyor 55. This conveyor transfers the asphalt to a standard breaking mechanism 56 where the asphalt is broken into finer fragments which are transferred by a suitable conveyor 57 to a pulverizer 58. The pulverizer is of standard commercial form, preferably of the beater type, and grinds the asphalt to powdered form. This powdered material is transferred by a conveyor 59 to the measuring apparatus 51 from which measured quantities of asphalt and solid materials are discharged continuously and conveyed by conveyor 60 to the heated mixer 61, preferably steam heated so that the asphalt is softened and, with the solid material, forms a plastic mass. This material is delivered in the desired quantities from the mixing device through the receptacle 43 by a conveyor 62 of appropriate form.

The details of the rotary press devices by which the method of the present invention may be practiced are illustrated more clearly in Figs. 10 et seq. The separated webs 63 which are illustrated as having received coatings of granular wear material on their outer surfaces, are led past the receptacle 43 in spaced relation. Within this receptacle is the plastic mixture of asphalt and solid material prepared in the manner described, and the webs pass by this receptacle and under the rolls 42 which hold the webs from the receptacle and may also include the projections 64 shaped to correspond to suitable cavities in the molding drums or cylinders 44. The cavities 65 in each drum have a shape corresponding to one-half of the final product and as each web passes around the roll 42, which may be driven by appropriate means, the projection 64 on the roll forces the web into successive cavities 65 in the cylinder. Then, as the cylinders are rotated, the webs travel with them, with portions of the webs lying in the bottoms of the cavities. The receptacle 43° is placed so that it discharges plastic material into the bite of the molding cylinders and the material thus enters the space between the uncoated faces of the webs. As the cylinders are rotated, a quantity of the plastic material is seized between a pair of cooperating cavities which are formed to give the mass of plastic material encased between the webs the desired shape.

The cavities in the cylinders 44 may be arranged to give the finished product any desired shape and section, but as illustrated in Fig. 12 the cavities in the two cylinders are arranged to produce an element of tapering section and the shallow end of each cavity 66 lies in advance of the tapered portion in the direction of movement of the cylinders. Thus as the cylinders rotate, cooperating cavities tend to seize a quantity of material discharged from the hopper and as the cooperating movement of the cavities proceeds, the material is compacted, solidified, and molded so as to fill the cavities completely and to assume the shape defined by them. Along their outlines the cavities are defined by knife edges 67 and when these edges come into contact they pinch and sever the web so that the element has the outline of the cavity and its section corresponds to the combined sections of a pair of cooperating cavities. The cavities have walls to produce the desired edge section of the product, as for example, in the production of an element such as that shown in Fig. 9, the cavities have sloping walls 68 leading from the flat surface 69 to the knife edge 67. It will thus be seen that the finished product includes a mass of plastic material which has been given a selected shape by a molding operation, and this plastic core is completely encased by a jacket made of webs. The edges of the webs are severed at the extreme edges of the element and in the form produced by the apparatus shown in Fig. 12, the extreme edges of each element lie between the planes of its upper and lower surfaces.

Owing to the manner in which the new product is made by the molding operation with the thin end of the product formed first, the plastic material at the thin end of the element undergoes a greater compacting pressure than is applied to this material at the thick end of the element. This is due to the fact that when the molding cylinders are in position, with the cutting edges at the thin end of an element about to be formed in contact, the plastic substance from the receptacle 43 enters the space between the two jacket sheets and as the cylinders rotate, the plastic material nearest the point of contact of the cutting edges is subjected to great pressure, while the material slightly above the actual point of contact of the cylinders is free to move upwardly and the excess above that required to fill the cavity may be forced out from between the cavities and back into the receptacle. The action of the cylinders on the plastic material as illustrated particularly in Figs. 14 and 15, is somewhat similar to an extrusion operation, the plastic material between the cylinders being forced by their rotation upwardly toward the main mass of material in the receptacle through an orifice of gradually increasing cross-section. The space between the cylinders taken on the section line 15—15 is illustrated in Fig. 15, and this space is defined by portions of the cavities which are relatively shallow. The mass which lies between the cylinders is forced upwardly through an orifice defined by the faces of the cavities and the knife edges, and this orifice is of gradually increasing cross-section, finally attaining the shape illustrated in Fig. 14, after which it abruptly changes in cross-section until it is closed by the contacting of the cutting edges 67. The result of the action described is to produce an article of tapered shape in which the plastic material is more forcefully acted on and compacted at the thin end of the element than at the thick end. As a consequence, the core has a varying density from one end to the other, with its greatest density at the thin end and its least density near the thick end. This increased density at the thin end makes this end somewhat more rigid and in the finished product the density of the core varies from end to end but the rigidity does not vary to a substantial extent owing to the fact that while the mass of core material is of diminishing density at the thick end, it is present in increased amounts.

In that step in the process illustrated in Figs. 12 et seq., it will be seen that the webs 63 are provided with coatings of wear surface on those faces which lie in contact with the molding cylinders, and the plastic material contacts thus with the uncoated faces of the web, so that a good bond is thus produced.

The web used may be of the width of a single shingle or of a plurality of shingles, or it may have a width appropriate for the manufacture of a strip shingle. In that step of the process illustrated in Fig. 10, the webs 63 have been slit into three subdivisions along the lines 70 by means of the rollers 40, and the webs are passed between molding cylinders having three sets of mold cavities 71. These cavities are arranged side by side so that each subdivision of the pair of webs lies in front of a pair of cavities. It will be noted that there is a space 72 between adjacent cavities in a row extending lengthwise of the cylinder 44 and this is due to the fact that the elements are made from a straight web but have a tapering section. As the webs are of uniform width and are used to encase a core of tapering section, this core necessarily has a diminished width at its thick end and accordingly the molds are formed so that while the element has an increased thickness at one end, its transverse peripheral measurement remains uniform throughout its length. Accordingly a web of uniform width may be used to make products of varying taper, the width of these products decreasing as the thickness increases. When the webs are slit lengthwise, as illustrated, it is of course not necessary to give the mold cavities cutting edges along the side edges of the element, and the knife edges are then placed only at the ends of the cavities, as at 73.

According to the new process, elements of different shapes and sizes may readily be produced, and this change is made in the apparatus illustrated by using drums of appropriate form. For example, a strip shingle may readily be produced, such as that illustrated in Fig. 8. This element may either have a gradual taper from its thin edge 20 to its butt edge 21, or else may have the section illustrated in Fig. 5, where the element is partly of uniform section. In the butt edge are formed the notches 29 which define the tabs 28. Such an element is produced by a molding drum having cavities of appropriate shape, these cavities having knife edges which slit the web slightly so that the notches may be formed at the same time the webs are consolidated with the body of the core. In the strip shingle it will be apparent that as the webs used are of uniform width, the presence of the notches and the increased thickness of the shingle along the butt edge require that the side edges of the shingle and the side edges of the notches converge slightly so that the transverse circumferential measurement of the element at the thin end is the equivalent of the sum of the transverse circumferential dimensions of the several tabs.

In Figs. 9 and 16 there are shown two forms of the element in enlarged section. In the element shown in Fig. 9 the webs 63 are both provided with wear surfaces so that the entire shingle is covered with wear material. This element has been formed of gradually increasing thickness from one end to the other and the upper and lower faces curve gently to the extreme edges, such as 31. One of the webs 63 differs from the other in that this web, which is to form the upper face of the element, has been folded upon itself, as indicated at 74, so that a shoulder 75 is produced. This shoulder lies directly beneath the point where an element of the upper course is to be placed, so that this upper element is raised slightly from the element beneath, thus adding to its apparent thickness. If desired, both faces however may be plain and without the folded part. The element with the fold in one face is produced by using a plain web and a web having appropriate folds at desired spacing.

The element shown in Fig. 16 is of somewhat modified form and is produced by using molding drums of appropriate shape. In this product one face 76 is substantially plane, while the other face 77 is curved at the thin end 78 and at the thick end 79 so that a product having one flat face and also having an increased thickness from one edge to the other is produced. In this element the web on the curving face is provided with wear material, while the web on the plane face is either untreated or else covered with a non-stick substance. It will be apparent that many other types of product may similarly be produced according to the new method, the formation of the final product depending on the shape of the mold cavities by which the product is made.

It will be seen that according to the new process an improved roofing material capable of wide application may readily be made in various forms, so that it may be used for numerous purposes. This process as usually carried out does not require elaborate machinery, and it may be practiced at a low cost for equipment to produce elements at a high out-put rate. While the product has been described as consisting of an asphaltic material and a binder, with the asphaltic material mixed in dry form with the binding material, it is evident that the process may be carried out by the use of the binding material in fluid form, in which event the primary steps of grinding the binder to desired size may be omitted. According to the new process the webs are used in the most economical manner and little waste occurs, since each web is used to encase a plastic core and all portions of the web are used for that purpose, with no excised parts, such as result in the manufacture of prepared roofings from felt. The apparatus described in connection with the process affords a convenient method of practicing the process, although it is evident that many changes may be made in this apparatus without departing from the invention.

This application is a division of my application, Ser. No. 139,612, filed October 5, 1926.

I claim:

1. A method of making products suitable for building purposes which comprises placing plastic material capable of hardening between a pair of facing sheets, and pressing the said sheets together to consolidate and mold the plastic material to a selected shape, such that the facing sheets cover both faces of the shaped plastic material and at least a pair of opposite edges thereof.

2. A method of making products suitable for building purposes which comprises placing plastic material capable of hardening between a pair of facing sheets of selected shape, and pressing the sheets to mold the plastic material to a shape such that the edges of the sheets meet at the edges of the shaped body of plastic material.

3. A method of making products suitable for building purposes which comprises placing plastic material capable of hardening between a pair of facing sheets, pressing the sheets together to consolidate and hold the plastic material between them to a selected shape such that the sheets cover both faces of the shaped plastic material and at least a pair of opposite edges thereof, and simultaneously cutting the sheets along the edges of the shaped plastic material covered by the sheets.

4. A method of making products suitable for building purposes which comprises placing plastic material capable of hardening within a jacket blank and applying pressure to the blank to consolidate and mold the plastic material to a selected shape, such that the blank completely encloses the plastic material and covers the edges thereof.

5. A method of making products suitable for building purposes which comprises placing plastic material capable of hardening within a jacket blank, applying pressure to the blank to consolidate and mold the plastic material within it to selected shape, and cutting the blank along the edges of the selected shape in such manner that the blank covers all edges of the body of plastic material.

6. A method of making products suitable for building purposes which comprises placing a pair of webs of sheet material in motion, maintaining them in spaced relation, placing plastic material capable of hardening between the webs and at one point in their travel applying pressure to the webs to consolidate and mold the plastic material between them to a selected shape and to cause the webs to cover at least a pair of opposite edges of the shaped plastic material.

7. A method of making products suitable for building purposes which comprises placing a pair of webs of sheet material in motion, maintaining them in spaced relation, placing plastic material capable of hardening between the webs, at one point in their travel applying pressure to the webs to consolidate and mold the plastic material between them to a selected shape and to cause the webs to cover at least a pair of opposite edges of the shaped plastic material, and cutting the webs along the edges covered by the webs.

8. A method of making products suitable for building purposes which comprises moving a pair of webs lengthwise and in spaced relation, feeding plastic material capable of hardening into the space between the webs, applying pressure to the webs to force them into contact with the plastic material, to mold the plastic material between them to a selected shape and to cause the webs to cover the edges of the shaped plastic material, and cutting the webs along the outlines of this shape.

9. A method of making products suitable for building purposes which comprises forming a jacket to selected shape by the application of pressure, introducing plastic material into the formed jacket, and applying pressure to consolidate and mold the plastic material to the shape given the jacket.

10. A method of making products suitable for building purposes which comprises forming a jacket to selected shape by the application of pressure, introducing plastic material into the formed jacket, applying pressure to consolidate and mold the plastic material to the shape given the jacket, and trimming the jacket around the outline of the shaped body of plastic material.

11. A method of making products suitable for building purposes which comprises moving a pair of webs of jacket material lengthwise, pressing these webs to give portions of them a selected shape, introducing plastic material into the space between the said portions of the web, and pressing these portions toward each other to enclose the plastic material, the pressing operation also consolidating and molding the plastic material to the desired shape.

12. A method of making products suitable for building purposes which comprises placing a pair of webs of jacket material in motion, separately forming portions of the webs to a selected shape, introducing plastic material between the said portions of the webs, and applying pressure to the webs to enclose the said plastic material and to mold it to the said shape.

13. A method of making products suitable for building purposes which comprises coating webs of jacket material, forming portions of these webs to a selected shape, placing plastic material between the formed portions of the webs, and pressing the webs together to enclose the plastic material and to mold the latter to the said shape.

14. A method of making products suitable for building purposes which comprises placing a pair of webs of jacket material in motion lengthwise thereof, introducing plastic material, between the webs, feeding the webs and the plastic material between cooperating molds, and applying pressure to the webs and the plastic mtaerial by means of the molds to consolidate the plastic material and to form it to a selected shape, and shaped plastic material being completely enclosed by the jacket material.

15. A method of making products suitable for building purposes which comprises moving a pair of webs of jacket material lengthwise, pressing each web into a mold member, inserting plastic material between the webs, and moving the mold members toward each other to force the webs and plastic material into intimate contact and to form the plastic material to a selected shape.

16. A method of making products suitable for building purposes which comprises moving a pair of webs and a quantity of plastic material between them between a pair of mold members and forcing these mold members together to consolidate the jacketed plastic material, to form it to a selected shape, and to cause the webs to meet at at least a pair of the opposite edges of the shaped plastic material.

17. A method of making products suitable for building purposes which comprises continuously advancing a pair of webs of fibrous material in spaced relation, at one point in the travel of the webs forcing them toward each other, at said point introducing plastic material between the webs to form a body for which the webs provide a jacket, molding the plastic material and the webs to a selected shape by the application of pressure, the molding operation causing the webs to cover at least a pair of opposite edges of the shaped plastic material and severing the webs along the said edges.

18. A method of making products suitable for building purposes which comprises placing plastic material capable of hardening within a packet blank, and applying pressure to the blank to consolidate and hold the jacketed plastic material to produce a succession of similar plate-like units each having a variable thickness from end to end thereof, the pressure being applied in such manner that the density varies in different parts of each unit.

19. A method of making products suitable for building purposes which comprises placing plastic material capable of hardening between a pair of jacket sheets, and applying pressure to the jacketed mass to mold it into a series of similar units of plate-like form and of tapering thickness from end to end, the pressure varying during application to cause the plastic material to have a varying density from one end of each unit to the other.

20. A method of making products suitable for building purposes which comprises placign plastic material capable of hardening between a pair of jacket sheets, and molding the jacketed mass to the form substantially of a plate of increasing thickness from one end to the other by the application of pressure so applied as to cause the plastic material to have a greater density at the thin end of the plate than at the thick end.

21. A method of making products suitable for building purposes which comprises continuously placing plastic material capable of hardening in a jacket, advancing the jacketed mass endwise, and subjecting it to pressure applied throughout the entire circumference thereof.

22. A method of making products suitable for building purposes which comprises continuously placing plastic material capable of hardening between a pair of jacket sheets, advancing the jacketed mass endwise, and while it is in motion subjecting it to pressure applied throughout the entire circumference thereof, said pressure varying as the mass advances to vary the density in different parts of the mass.

In testimony whereof I affix my signature.

THOMAS ROBINSON.